United States Patent
Nishimura (10) Patent No.: US 6,754,576 B2
(45) Date of Patent: Jun. 22, 2004

(54) ELECTRONIC CONTROL UNIT HAVING DIFFERENT MASK RETURN PROCESSES

(75) Inventor: Tadaharu Nishimura, Obu (JP)

(73) Assignee: Denso Corporation, Kariya (JP)

( * ) Notice: Subject to any disclaimer, the term of this patent is extended or adjusted under 35 U.S.C. 154(b) by 36 days.

(21) Appl. No.: 10/331,906

(22) Filed: Dec. 31, 2002

(65) Prior Publication Data

US 2003/0135319 A1 Jul. 17, 2003

(30) Foreign Application Priority Data

Jan. 11, 2002 (JP) ........................................ 2002-004755

(51) Int. Cl.[7] ................................................. G06F 9/46
(52) U.S. Cl. ......................... 701/102; 701/115; 701/29; 709/318
(58) Field of Search ................................. 701/102, 115, 701/114, 29, 31, 35; 709/318, 107

(56) References Cited

U.S. PATENT DOCUMENTS

| | | | | |
|---|---|---|---|---|
| 4,441,473 A | * | 4/1984 | Isomura et al. | 123/674 |
| 6,067,009 A | * | 5/2000 | Hozuka et al. | 701/29 |
| 2002/0078257 A1 | | 6/2002 | Nishimura | 709/318 |

FOREIGN PATENT DOCUMENTS

| | | |
|---|---|---|
| JP | 6004320 | 1/1994 |
| JP | 8328615 | 12/1996 |
| JP | 10161889 | 6/1998 |
| JP | 2001229036 | 8/2001 |

* cited by examiner

Primary Examiner—Hieu T. Vo
(74) Attorney, Agent, or Firm—Nixon & Vanderhye P.C.

(57) ABSTRACT

A control program for an electronic control unit includes interrupt processes, tasks and a real-time operating system which controls switching of tasks based on execution priorities. The control program designates the interrupt level as a mask level in a predetermined task, and has an interrupt prohibition interval in which an interrupt of the interrupt process of the lower interrupt level and switching of the tasks are prohibited. The control program is programmed not to execute a task scheduling process of the real-time operating system at an end of the interrupt prohibition interval under a predetermined condition in which it is not likely that the tasks are switched at the end of the interrupt prohibition interval.

4 Claims, 6 Drawing Sheets

|  | INT. LEVEL | TASK LEVEL |
|---|---|---|
| A-INTERRUPT PROCESS | 4 | – |
| B-INTERRUPT PROCESS | 3 | – |
| C-INTERRUPT PROCESS | 2 | – |
| D-INTERRUPT PROCESS | 1 | – |
| a-TASK | 0 | 3 |
| b-TASK | 0 | 2 |
| c-TASK | 0 | 1 |

FIG. 3B b-TASK ENTERS INTO QUEUE OF TASK LEVEL 2

ELECTRONIC CONTROL UNIT HAVING DIFFERENT MASK RETURN PROCESSES

CROSS REFERENCE TO RELATED APPLICATION

This application is based on and incorporates herein by reference Japanese Patent Application No. 2002-4755 filed on Jan. 11, 2002.

FIELD OF THE INVENTION

The present invention relates to a task switching technology that uses a real-time operating system.

BACKGROUND OF THE INVENTION

In a control program used for an electronic control unit (ECU) mounted on a vehicle, for instance, it is required to execute predetermined processing in real-time for ensuring control responsiveness and safety. Therefore, the control program is defined in units of tasks which are assigned with respective priorities of execution. The tasks are switched by a real-time operating system (ROTS), and interrupt processing having a higher execution priority than tasks is executed with priority over the tasks.

For instance, when an interrupt request is made to the interrupt process in the middle of execution of the task, the interrupt process is executed in the course of the task. Normally, after the termination of the interrupt process, the interrupted task is executed.

It is however possible that the activation request for another task which has a higher priority over the interrupted task, for instance, is issued in the course of the interrupt process. In this instance, after the termination of the interrupt process, it is required to execute another task with priority over the interrupted task. For this reason, at the end of the interrupt processing, the RTOS executes task scheduling processing to determine the order of execution of processes and tasks. This task scheduling processing is executed not only at the time of termination of the interrupt process but also at the end of the task.

Although an interrupt prohibition interval is set within the task in some cases, the task scheduling processing is executed at the end of each interrupt prohibition interval as well. However, the task scheduling processing becomes useless at the end of the interrupt prohibition interval in some cases.

For instance, if the interrupt prohibition interval is assigned with the mask level which is higher than any other interrupt levels, no interrupt processes is allowed to interrupt in the interrupt prohibition interval. Therefore, in this instance, the task scheduling is useless and not desirable, because it takes time to be executed and lowers overall speed of execution of the processes and tasks.

SUMMARY OF THE INVENTION

The present invention has been made to overcome the above problem, and has an object to optimize a task scheduling process executed at the end of an interrupt prohibition interval.

According to the present invention, an electronic control unit has a control program. This control program includes tasks, interrupt processes and a real-time operating system (RTOS). The tasks have respective execution priorities and executed by switching. RTOS switches tasks based on activation requests of the tasks and the task levels. Interrupt processes are executed by interrupting the tasks and are assigned respective interrupt levels. An interrupt prohibition interval is set in predetermined tasks of the control program. The interrupt prohibition interval designates the interrupt level as a mask level so that an interrupt of the interrupt process of the lower interrupt level and switching of the tasks are prohibited. The control program is coded so that a task scheduling process that switches the tasks at the end of the interrupt prohibition interval is not executed under a predetermined condition in which it is clear that the tasks are not switched at the end of the interrupt prohibition interval.

The predetermined condition may be one of the following cases. The highest or much higher interrupt level among the interrupt levels of the interrupt processes that requests activation of the tasks in the interrupt prohibition interval is designated as the mask level. No task activation request is made in the interrupt prohibition interval, and it is only necessary that at least the interrupt of the interrupt processes which requests the activation is prohibited. The task level of the predetermined task having the interrupt prohibition interval has the highest task level.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
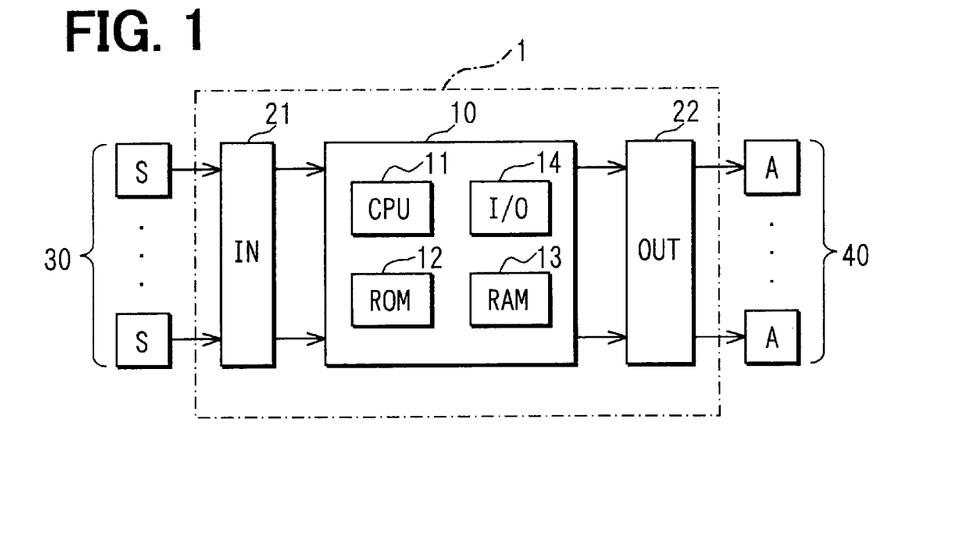
FIG. 1 is a block diagram showing an engine ECU according to an embodiment of the present invention.

Referring to FIG. 1, an electronic control unit for engines (engine ECU) 1 is for controlling an internal combustion engine. The engine ECU 1 is equipped with an input circuit 21, a microcomputer 10 and an output circuit 22. The input circuit 21 receives signals from various sensors 30 and performs waveform shaping and A/D-conversion.

The sensors 30 are for detecting engine operating conditions and includes a rotation angle sensor for generating a pulse signal each time the crankshaft of the engine rotates a predetermined angular rotation, a reference position sensor for generating a pulse signal each time the piston of a specified cylinder of the engine reaches a predetermined position (for instance, top dead center: TDC), a coolant temperature sensor for detecting the temperature of coolant of the engine, an oxygen concentration sensor for detecting oxygen concentration, and the like.

The microcomputer 10 executes various processing for controlling the engine based on sensor signals applied through the input circuit 21. The output circuit 22 drives actuators 40 such as injectors (fuel injection device) and an igniter (ignition device) mounted on the engine based on control data applied from the microcomputer 10.

The microcomputer 10 includes a known CPU 11 for executing various programs including an engine control program, ROM 12 for storing the programs executed by the CPU 11, RAM 13 for storing calculation results and the like produced by the CPU 11, I/O 14 for exchanging signals between the input circuit 21 and the output circuit 22, various registers, free-run counters and the like (not shown). The ECU 1 executes engine control processing in which the actuators 40 connected to the output circuit 22 are driven based on the signals input from the various sensors 30 through the input circuit 21.

Figure 2:
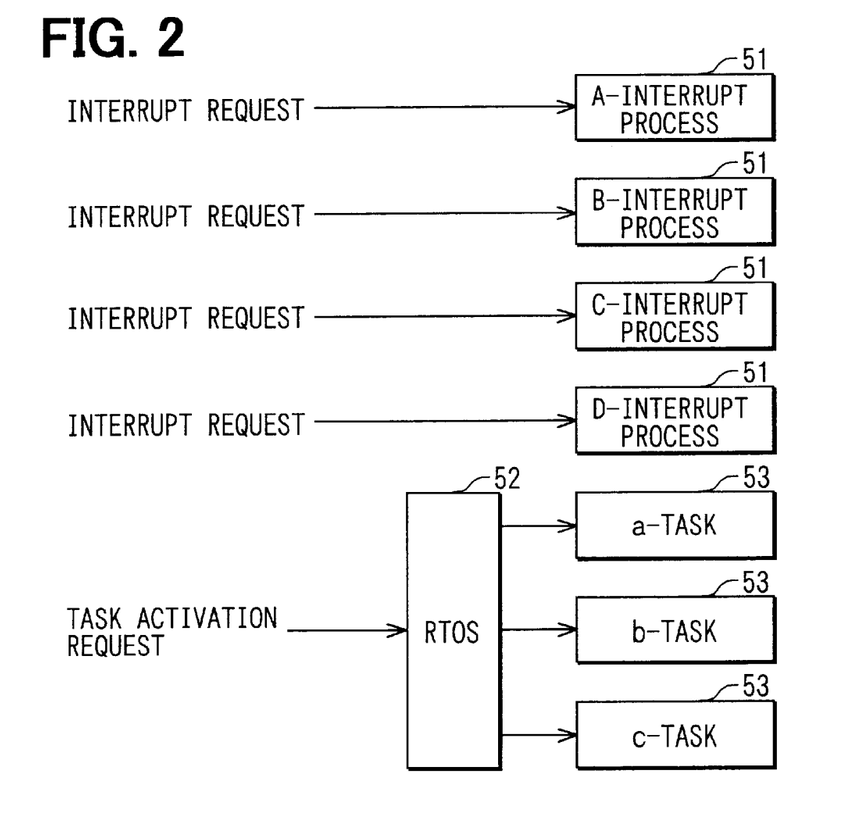
FIG. 2 is a diagram showing an engine control program provided in the engine ECU.

The engine control program includes, as shown in FIG. 2, at least interrupt processes 51, a real-time operating system (RTOS) 52 and tasks 53.

The interrupt processes 51, that is, A-interrupt process to D-interrupt process, are executed in response to interrupt requests. The execution priorities of the A-interrupt process to D-interrupt process 51 are defined in the order of A, B, C and D. The execution priorities of these processes 51 are referred to as interrupt levels. The interrupt requests to the interrupt processes 51 may be made based on the signals from the sensors 30, may be made at predetermined time intervals by an internal free-run counter of the microcomputer 10, or may be made based on network information of an in-vehicle LAN, etc.

The tasks 53, that is, a-task to c-task, are executed in response to a task activation request. The execution priorities of the a-task to c-task are defined in the order of a, b and c. The execution priorities of these tasks 53 are referred to as task levels hereunder. The task activation requests to the tasks 53 are made by the interrupt processes 51 or tasks 53.

Figure 3A:
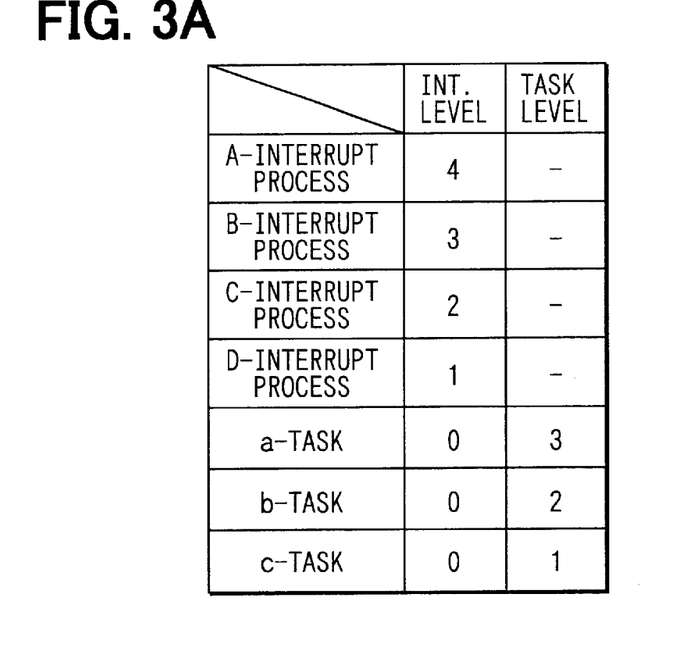
FIG. 3A is a diagram showing a relation between interrupt levels and task levels in the engine control program.

More specifically, different interrupt levels and task levels are assigned as shown in FIG. 3A. The execution priority becomes higher as the numerical value of level increases with respect to each of the interrupt level and the task level.

As understood from FIG. 3A, among the A-interrupt process to D-interrupt process 51, the A-interrupt process has the highest priority due to its interrupt level "4." On the other hand, the D-interrupt process has the lowest priority due to its interrupt level "1."

Further, among the a-task to c-task 53, the relation of priority is defined so that the a-task 53 has the highest execution priority due to its task level "3," and the c-task 53 has the lowest execution priority due to its task level "1." The interrupt levels relative to the A-interrupt process to D-interrupt process 51 are "0." Therefore, each interrupt process 51 is executed with priority over the tasks 53.

When an activation request is made to a task 53, information of the task 53 to which the activation request has been made is stored in the queue provided in the RTOS 52. This queue is provided for each task level of the tasks 53. Therefore, by searching the queue in the order of task levels in performing the task scheduling process, the RTOS 52 switches tasks 53 in correspondence with task levels and executes the task 53 of higher task level with priority.

Figure 3B:
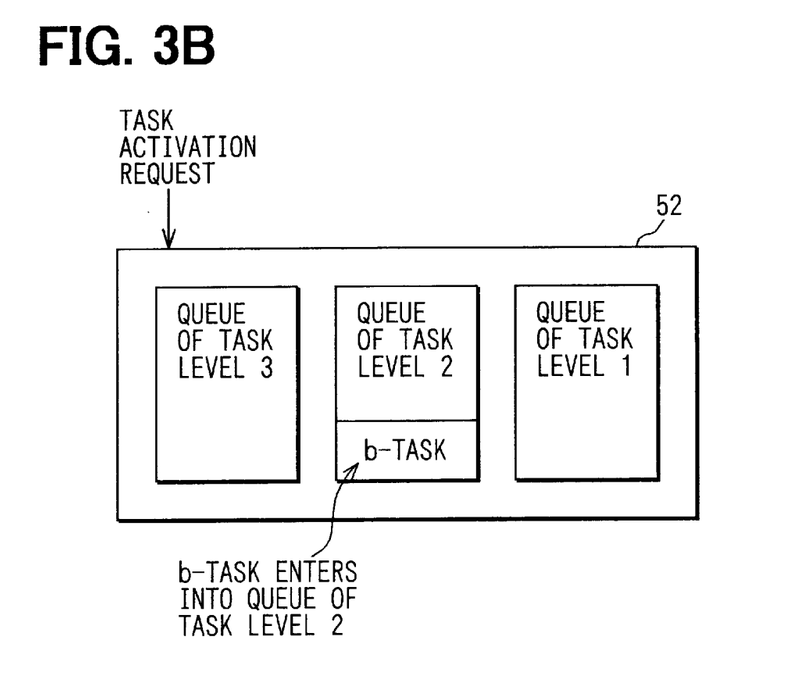
FIG. 3B is a diagram showing task scheduling process in the engine control program.

For instance, as shown in FIG. 3B, when the activation request for the b-task 53 is issued in the course of the B-interrupt process 51, the information indicating the b-task 53 is stored in the queue provided in the RTOS 52. In the RTOS 52, queues are provided for task levels, respectively. Therefore, the information indicating the b-task 53 is stored in the queue of the corresponding task level 2.

Therefore, in the task scheduling processing executed by the RTOS 52, the queues are searched in order from the queue of the task level 3 having high priority followed by the queue of the task level 2 and the queue of the task level 1. If an activation request is issued to the task 53 having the higher priority than the task 53 which is now being executed, the execution is switched to the high priority task 53. That is, when the task scheduling processing is executed after the termination of the B-interrupt process 51, the b-task 53 is executed with priority of the c-task 53. The interrupted c-task 53 is executed after the termination of the b-task 53.

When the interrupt process 51 of higher execution priority than the tasks 53 interrupts without limitation, that is, in any cases, certain interference will be likely to occur with respect to a resource being shared. Therefore, an interrupt prohibition process is executed in the task 53 so that the interrupt process 51 that will affect the shared resource is prohibited.

In this interrupt prohibition process, the interrupt level is designated as a "mask level" so that the interrupt by the interrupt process 51 having the interrupt level lower than the mask level is prohibited.

As a result, prohibition of interrupt does not necessarily mean that all the interrupt processes 51 are prohibited without limitation. Therefore, it is possible that the interrupt process 51 of higher interrupt level than the designated mask level is executed during an interval (interrupt prohibition interval) after the interrupt is prohibited until the interrupt is permitted. Since this interrupt process 51 is likely to request the activation of the task 53, the above task scheduling process is normally executed at the end of the interrupt prohibition interval.

Figure 4A:
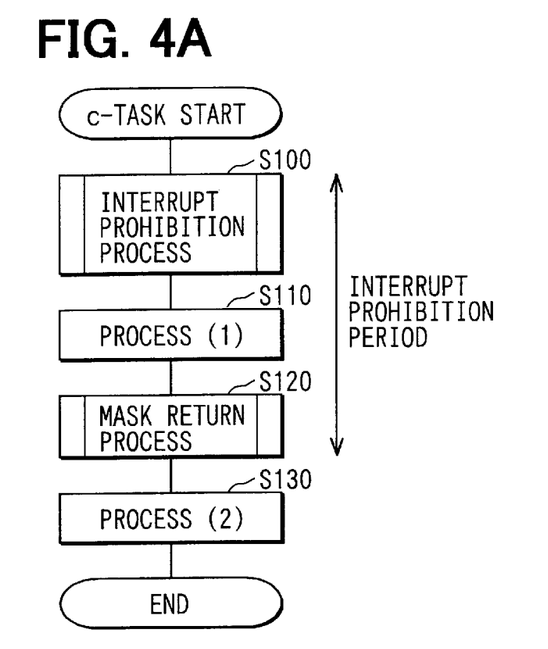
FIG. 4A is a flowchart showing a c-task process in the engine control program.

Referring to FIG. 4A that exemplifies the process of the c-task 53, a process (1) at S110 and a process (2) at S130 are the main parts. Since the interference occurs with some interrupt processes 51 in the process (1), the interrupt prohibition process (S100) and a mask return process (S120) are executed before and after the process (1), respectively.

Figure 5:
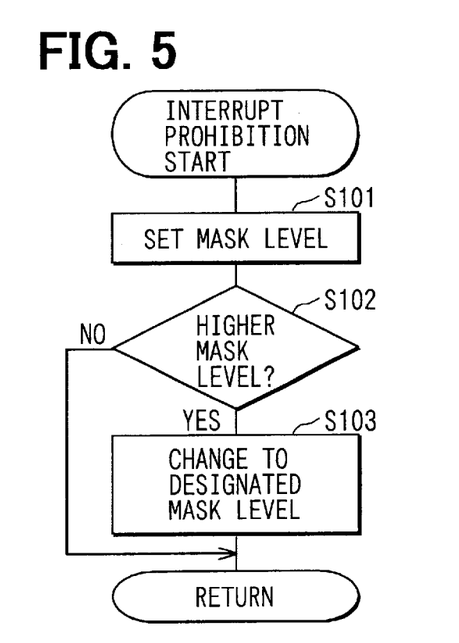
FIG. 5 is a flowchart showing an interrupt prohibition process in the engine control program.

As shown in FIG. 5, the interrupt prohibition process first stores the mask level (S101). The mask level at the time of permission of interrupt is "0." Therefore, unless interrupt is prohibited, this mask level "0" is stored. The mask level is stored because it is likely that an interval of a higher mask level such as mask level "2" is set in the interrupt prohibition interval of mask level "1."

Therefore, it is determined next whether a mask level higher than the present mask level is designated. The determination becomes affirmative, if the mask level "2" is designated in the interrupt prohibition interval of mask level "1." If higher mask level has been designated (S102: YES), the mask level is changed to the designated level (S103), and this interrupt prohibition process is terminated. If the designated mask level is lower than the present level (S102: NO), on the contrary, this interrupt prohibition process is terminated without execution of S103.

Figure 6A:
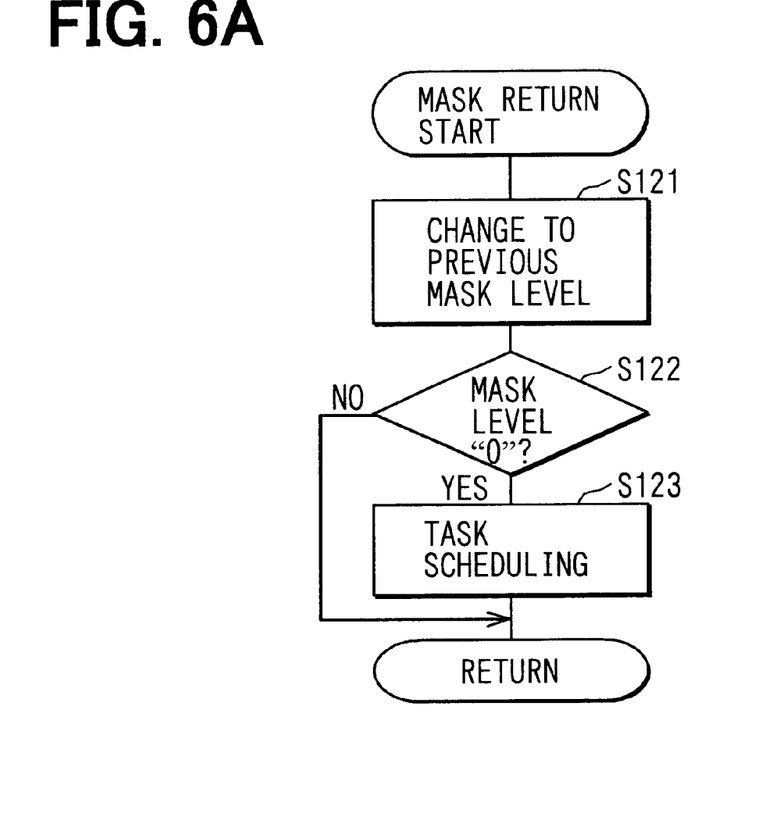
FIG. 6A and FIG. 6B are flowcharts showing mask return processes in the engine control program.

In a mask return process, as shown in FIG. 6A, the mask level is changed to the previous level (S121), and it is determined (S122) whether the mask level is "0." If the mask level is "0" (S122: YES), the task scheduling process is executed (S123).

Here, it is to be noted that "previous mask level" is the mask level which has been stored at S101 in the immediately preceding interrupt prohibition process (FIG. 5). It is possible that an interval of higher mask level is set in an interrupt prohibition interval. Therefore, following the process of S121, it is determined (S121) whether the mask level has become "0" and the task scheduling is executed (S123). Until the mask level becomes "0," the execution of tasks 53 is prohibited, because the task scheduling need not be executed.

Figure 4B:
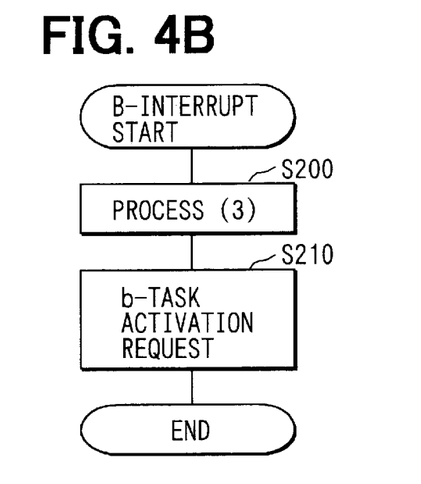
FIG. 4B is a flowchart showing a B-interrupt process in the engine control program.

FIG. 4B is a flowchart exemplifying the B-interrupt process. In the B-interrupt process, activation of the b-task is requested at S210 following the process (3) at S200. The interrupt level of the B-interrupt process is "3" as shown in FIG. 3A. Therefore it is not possible that the B-interrupt process 51 interrupts in the interrupt prohibition interval of the c-task so long as the mask level designated by the interrupt prohibition process in execution of the c-task is "3" or larger. On the contrary, if the mask level is "2" or smaller, it is possible that the B-interrupt process interrupts in the interrupt prohibition interval of the c-task.

Figure 7A:
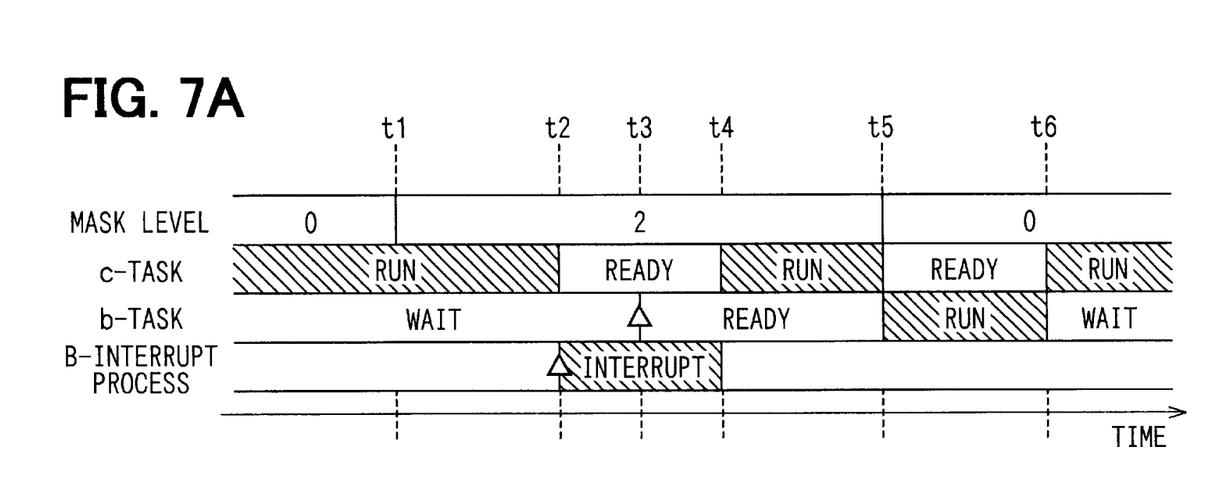
FIG. 7A and FIG. 7B are timing charts showing interrupts and task switching operation attained in correspondence with mask levels.

In FIG. 7A, the mask level is assumed to be "2" when the interrupt prohibition process (S100 in FIG. 4A) is executed at time t1 after execution of the c-task 53 is started. In this instance, if an interrupt request to the B-interrupt process 51 is issued at time t2 as indicated with a mark Δ, the B-interrupt process 51 interrupts the c-task 53 because the interrupt level of the B-interrupt process 51 is "3" and higher than the mask level "2."

At time t3, the activation request to the b-task 53 is assumed to be issued in the B-interrupt process (S210 in FIG. 4B) as indicated with a mark Δ. This task activation request is stored in the queue of RTOS 52 shown in FIG. 3B. Since the task level of the b-task 53 is "2," the information indicating the b-task 53 is stored in the queue of the task level "2." At time t4, the B-interrupt process 51 is terminated and the c-task 53 which has been interrupted is executed again.

Next, at time t5, the mask return process is executed (S120 in FIG. 4A), and the mask level returns to "0." As a result, the task scheduling process (S123 in FIG. 6A) is executed. In this instance, since information indicating the b-task 53 is stored in the queue of RTOS 52, the RTOS 52 switches from the c-task 53 to the b-task 53, so that the b-task is executed with priority over the c-task 53. When the b-task 53 is terminated at time t6, the interrupted c-task is executed again.

Figure 7B:
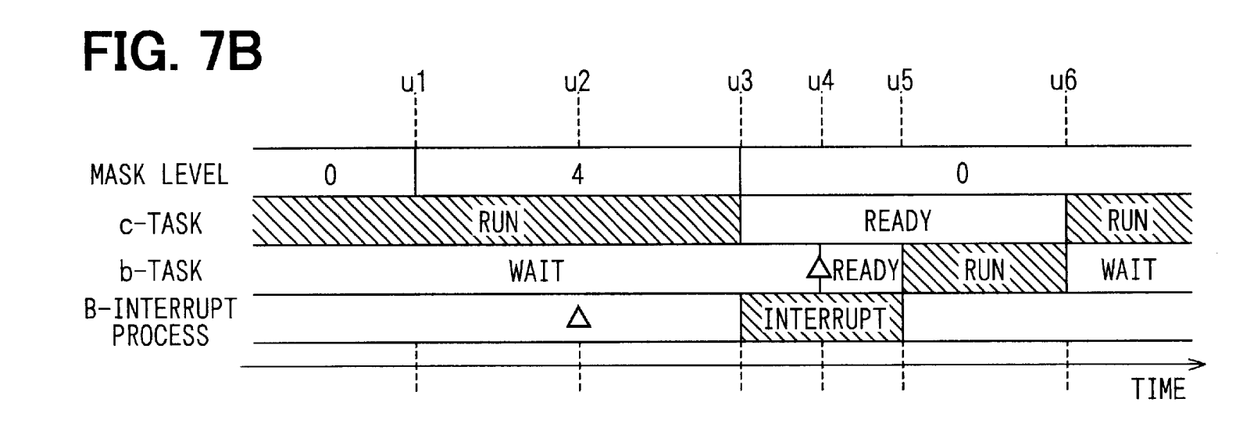

In FIG. 7B, on the other hand, it is assumed that the interrupt prohibition process (S100) is executed at time u1 after the execution of the c-task 53 is started, and the mask level is "4." As a result, even if the interrupt request to the B-interrupt process 51 is issued at time u2 as indicated with the mark Δ, the B-interrupt process 51 does not interrupt the c-task, because the interrupt level of the B-interrupt process 51 is "3," and lower than the mask level "4."

Therefore, the mask return process is executed (S120 in FIG. 4A) at time u3, and the B-interrupt process 51 is executed only after the mask level become "0."

Then at time u4, the activation request to the b-task 53 is issued (S210 in FIG. 4B in the B-interrupt process as indicated with the mark Δ. This information based on the task activation request is stored in the queue of RTOS 52 shown in FIG. 3B as described above.

When the B-interrupt process 51 is terminated at time u5, the b-task 53 is executed. Further, when the b-task 53 is terminated at time u6, the interrupted c-task 53 is executed again. This switching of the task 53 is realized by the task scheduling executed at the end of the interrupt process 51 and the termination of the task 53.

In FIG. 7B, the B-interrupt process 51 is not executed in the interrupt prohibition interval of the mask level "4" lasting from time u1 to time u3. Therefore, it is not possible that the activation request to the b-task 53 is issued in the interrupt prohibition interval.

In this instance, if the mask return process shown in FIG. 6A is executed without limitation, the task scheduling process is necessarily executed at time u3 in FIG. 7B. That is, even if it is not possible that the task activation request is issued, the task scheduling process is executed at the end of the interrupt prohibition interval and hence time required for executing the task scheduling is unnecessarily wasted.

In this embodiment, however, two kinds of mask return processes (S120 in FIG. 4A) are provided. One is shown in FIG. 6A as described above, and the other is shown in FIG. 6B. The mask return process shown in FIG. 6B executes only changing to the previous mask level (S124).

Figure 6B:
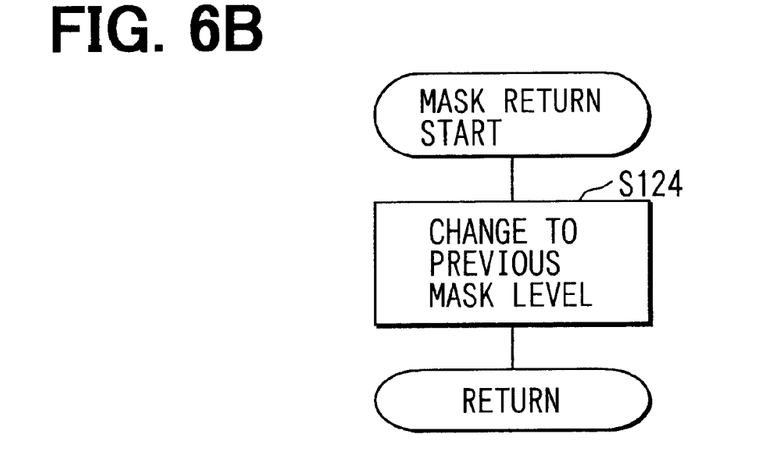

Programmers determines whether it is likely that the tasks 53 are switched at the end of the interrupt prohibition interval, and perform coding of the task 53 so that if there is no such possibility, the mask return process shown in FIG. 6B is executed. To be more specific, the task is coded so that the mask return process shown in FIG. 6A is executed at S120 in FIG. 4A in the case that an interrupt is prohibited with the mask level "2" as shown in FIG. 7A. On the other hand, it is coded so that the mask return process shown in FIG. 6B is executed at S120 in FIG. 4A in the case that an interrupt is prohibited with the mask level "4", as shown in FIG. 7B.

The tasks 53 will not possibly be switched in the following two cases (1) and (2).

(1) The mask level is determined to be an interrupt level which is or higher than the highest interrupt level among interrupt levels set to the interrupt processes 51 that issues activation requests to the tasks 53.

In the above embodiment, the activation request to the b-task 53 is issued in the B-interrupt process 51 (S210 in FIG. 4). If no task activation request is issued from the A-interrupt process 51 in this instance, no task activation request will be issued in the interrupt prohibition interval of the interrupt level "3" or larger, that is, the mask level "3" or "4" is designated.

(2) The interrupt prohibition interval is set to the task 53 of the highest task level.

In the above embodiment, the interrupt prohibition interval of the c-task is considered. However, the task scheduling becomes unnecessary at the end of the interrupt prohibition interval of the a-task 53. Because the task level of the a-task 53 is "3" and the highest among the tasks 53, it is not likely that the tasks 53 are switched even if the activation request to the tasks 53 is issued.

Therefore, in the above cases (1) and (2), the programmers performs coding of an engine control program by defining the tasks 53 so that the mask return process shown in FIG. 6B is executed.

According to the engine ECU 1 having the above engine control program of the embodiment, unnecessary task scheduling process that is executed at the end of the interrupt prohibition interval can be eliminated and program execution speed can be enhanced, thereby ensuring the real-time processing characteristics.

Figure 8:
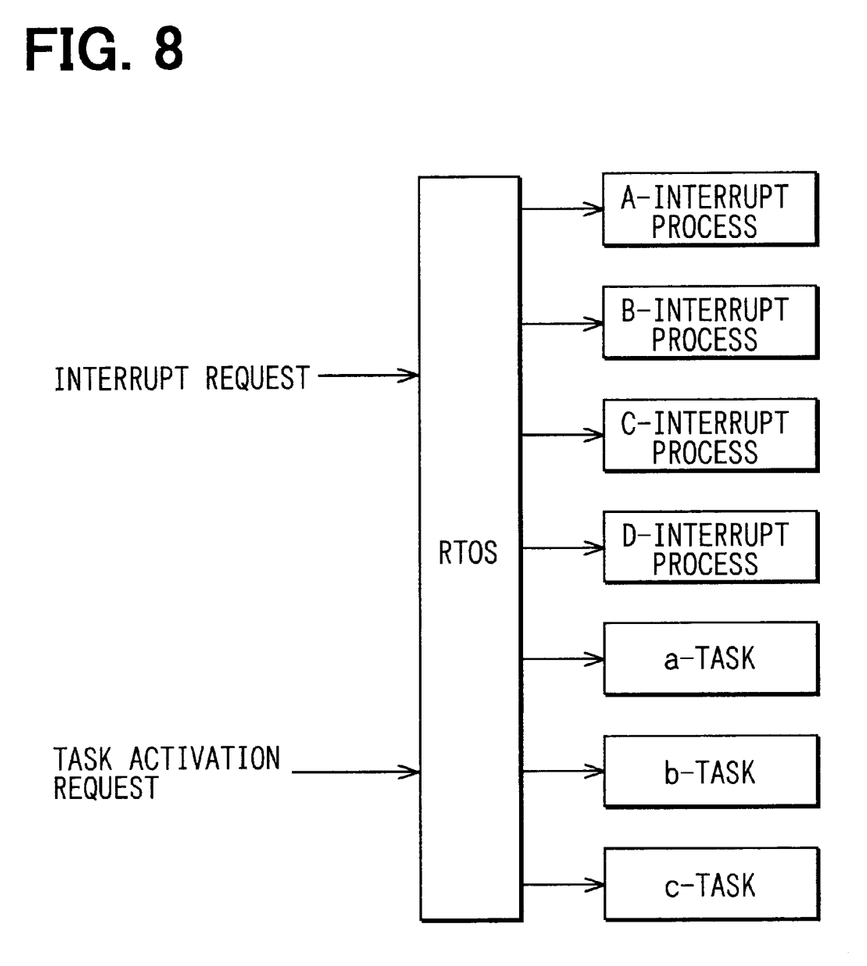
FIG. 8 is a diagram showing another engine control program.

The present invention should not be limited to the embodiment, but may be implemented in many other ways without departing from the spirit of the invention. For instance, the program may be so constructed that the A-interrupt process to D-interrupt process are executed by way of the RTOS as shown in FIG. 8. Further, the control program may be any control programs other than the engine control programs.

What is claimed is:

1. An electronic control unit having a control program that comprises tasks having respective execution priorities, a real-time operating system that requests activation of the tasks and switches the tasks based on the task levels, and interrupt processes that are assigned respective interrupt levels indicating execution priorities and executed by interrupting the tasks, wherein the control program designates the interrupt level as a mask level in a predetermined task, and has an interrupt prohibition interval in which an interrupt of the interrupt process of the lower interrupt level and switching of the tasks are prohibited, and wherein the control program is programmed not to execute a task scheduling process of the real-time operating system (52) that switches the tasks at an end of the interrupt prohibition interval under a predetermined condition in which it is not likely that the tasks are switched at the end of the interrupt prohibition interval.

2. An electronic control unit as in claim 1, wherein the predetermined condition includes a case in which a highest or much higher interrupt level among the interrupt levels of the interrupt processes that requests activation of the tasks in the interrupt prohibition interval is designated as the mask level.

3. An electronic control unit as in claim 1, wherein the predetermined condition includes a case in which the task level of a predetermined task for which the interrupt prohibition interval is set is a highest one.

4. An electronic control unit as in claim 1, wherein the control program has different mask return processes that are executed at the end of the interrupt prohibition interval, one of the mask return processes being for eliminating the task scheduling process under the predetermined condition and another of the mask return processes being for executing the task scheduling process under other conditions.

* * * * *